(12) United States Patent
Sunohara et al.

(10) Patent No.: US 9,981,695 B2
(45) Date of Patent: May 29, 2018

(54) VEHICLE LOWER-BODY STRUCTURE

(71) Applicant: HONDA MOTOR CO., LTD., Tokyo (JP)

(72) Inventors: Kenji Sunohara, Wako (JP); Hitoshi Inoue, Wako (JP); Shinji Kawachi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/404,747

(22) Filed: Jan. 12, 2017

(65) Prior Publication Data

US 2017/0203792 A1 Jul. 20, 2017

(30) Foreign Application Priority Data

Jan. 14, 2016 (JP) .................................. 2016-005095

(51) Int. Cl.

| B62D 21/15 | (2006.01) |
|---|---|
| B62D 25/02 | (2006.01) |
| B62D 25/04 | (2006.01) |
| B62D 25/20 | (2006.01) |
| B62D 27/02 | (2006.01) |
| B62D 29/00 | (2006.01) |

(52) U.S. Cl.
CPC ........... *B62D 21/157* (2013.01); *B62D 21/15* (2013.01); *B62D 25/025* (2013.01); *B62D 25/04* (2013.01); *B62D 25/2036* (2013.01); *B62D 27/023* (2013.01); *B60Y 2304/03* (2013.01); *B60Y 2306/01* (2013.01); *B60Y 2410/124* (2013.01); *B62D 29/007* (2013.01)

(58) Field of Classification Search
CPC .... B62D 21/15; B62D 21/157; B62D 25/025; B62D 25/04; B62D 25/2036
USPC ...... 296/187.12, 193.05, 193.06, 203.03, 209
See application file for complete search history.

(56) References Cited

U.S. PATENT DOCUMENTS

| 4,944,553 A * | 7/1990 | Medley ................. B62D 25/04 |
| | | 296/203.03 |
| 9,090,291 B1 * | 7/2015 | Kanagai ............... B62D 25/025 |
| 2010/0207428 A1 * | 8/2010 | Fukushima ............ B62D 25/02 |
| | | 296/203.03 |
| 2015/0008703 A1 * | 1/2015 | Furusaki ............. B62D 21/152 |
| | | 296/187.08 |
| 2016/0039466 A1 * | 2/2016 | Yamamoto ............ B62D 25/04 |
| | | 296/193.06 |

(Continued)

FOREIGN PATENT DOCUMENTS

| JP | 2013-166435 A | 8/2013 |
| WO | 2014/155539 A1 | 10/2014 |

*Primary Examiner* — Gregory A Blankenship
(74) *Attorney, Agent, or Firm* — Westerman, Hattori, Daniels & Adrian, LLP

(57) ABSTRACT

A vehicle lower-body structure includes a front pillar, including a front-pillar outer panel and a front-pillar inner panel, and a side sill, including a side-sill outer panel and a side-sill inner panel and joined to a lower portion of the front pillar. The front-pillar outer panel is joined to an outer surface of the side-sill outer panel. The front-pillar inner panel is held between the side-sill outer panel and the side-sill inner panel. The side-sill outer panel and the side-sill inner panel respectively include vertical beads in front of a reinforcement member disposed at a front portion of the side sill and below the front pillar, the vertical beads extending vertically.

16 Claims, 13 Drawing Sheets

(56) References Cited

U.S. PATENT DOCUMENTS

| | | | |
|---|---|---|---|
| 2016/0194032 A1* | 7/2016 | Yamamoto | B62D 25/025 |
| | | | 296/193.05 |
| 2017/0050679 A1* | 2/2017 | Shirooka | B62D 25/025 |
| 2017/0113732 A1* | 4/2017 | Lee | B62D 25/04 |
| 2017/0203792 A1* | 7/2017 | Sunohara | B62D 25/2036 |
| 2017/0313357 A1* | 11/2017 | Narahara | B62D 25/04 |
| 2017/0313358 A1* | 11/2017 | Narahara | B62D 25/04 |
| 2017/0313359 A1* | 11/2017 | Narahara | B62D 25/025 |
| 2017/0361875 A1* | 12/2017 | Ayuzawa | B62D 21/15 |

* cited by examiner

VEHICLE LOWER-BODY STRUCTURE

CROSS REFERENCES TO RELATED APPLICATIONS

The present application claims priority under 35 U.S.C. § 119 to Japanese Patent Application No. 2016-005095, filed Jan. 14, 2016, entitled "Vehicle Lower-Body Structure." The contents of this application are incorporated herein by reference in their entirety.

TECHNICAL FIELD

The present disclosure relates to a vehicle lower-body structure and particularly to a vehicle lower-body structure that has enhanced absorption of an impact load imposed when an object, such as an oncoming car, collides against a side-sill front end at a right or left front end portion of a vehicle, that is, when the vehicle has undergone a so-called narrow offset, crash.

BACKGROUND

A narrow offset, crash is a crash, also called a small overlap crash, in which an object, such as an oncoming car, collides against an outer side of a front side frame of a vehicle at a small overlapping portion. An example known as an existing measure against a narrow offset crash is a vehicle lower-body structure including a crushable region at a front end portion of the side sill to absorb an impact (for example, see Japanese Patent Application Publication No. 2013-166435).

The vehicle lower-body structure described in Japanese Patent Application Publication No. 2013-166435 includes a crushable region, which absorbs an impact load and is situated at a front end portion of the side sill, a bulkhead, installed in the side sill, a jack-up reinforcing plate, vulnerable against the load in the vehicle front-rear direction, and a deformable member, having a hat-shaped vertical section. This vehicle lower-body structure, including the deformable member, increases the degree of absorption of the impact energy and prevents a portion located to the rear of the crushable region from being deformed.

Another example known as a measure for preventing the front pillar from falling in case of a narrow offset crash is an automobile vehicle side-body structure including a divided patch at a corner portion of a door opening and the front pillar is coupled to the front end of the side sill with the divided patch interposed therebetween (see, for example, International Publication No. 2014/155539).

The vehicle side-body structure described in International Publication No. 2014/155539, including a divided patch at a corner portion at which the front pillar and the side sill are coupled with each other, prevents deformation of the cabin in case of a narrow offset crash. The divided patch is disposed so as not to unnecessarily interfere with the front pillar (reinforcement body) from the vehicle outer side when the front pillar falls rearward due to an imposition of an impact load from the front wheel.

SUMMARY

According to study by the present inventors, the vehicle lower-body structure described in Japanese Patent Application Publication No. 2013-166435 involves a deformable member for impact absorption and is thus disadvantageous in increases in number of components, weight, and number of assembly steps. The vehicle lower-body structure described in Japanese Patent Application Publication No. 2013-166435 is thus required to be simplified for weight reduction and productivity enhancement.

The vehicle side-body structure described in International Publication No. 2014/155539 does not include an energy absorptive member and is thus disadvantageous in terms of a poor performance of absorbing an impact in case of a crash. In the vehicle side-body structure described in International Publication No. 2014/155539, the divided patch is joined to a portion at which a front-pillar outer panel (reinforcement body) and a side-sill outer panel (rocker outer reinforcement) are connected together to reinforce only the outer side. Such a vehicle side-body structure fails in weight reduction due to a need of an increase in thickness of the front-pillar outer panel or the divided patch or a need of additional reinforcing members or impact absorption members.

The present application describes, for example, a vehicle lower-body structure highly absorbing an impact imposed thereon in a narrow offset crash, achieving weight reduction, and having high productivity.

A vehicle lower-body structure according to the present application includes a front pillar, including a front-pillar outer panel and a front-pillar inner panel superposed one on the other in a vehicle width direction to define a closed section extending vertically, and a side sill, including a side-sill outer panel and a side-sill inner panel superposed one on the other in the vehicle width direction to define a closed section extending in a front-rear direction, the side sill including a front portion joined to a lower portion of the front pillar. The front-pillar outer panel is joined to an outer surface of the side-sill outer panel. The front-pillar inner panel is held between the side-sill outer panel and the side-sill inner panel. A reinforcement member is disposed on the front portion of the side sill. Each of the side-sill outer panel and the side-sill inner panel includes a vertical bead in front, of the reinforcement member and below the front pillar, the vertical bead extending vertically.

In this configuration, the side-sill outer panel and the side-sill inner panel each include a vertical bead in front of the reinforcement member disposed on the front portion of the side sill. Thus, when, in case of a narrow offset crash, a pressing load is imposed on the front end of the side sill from a wheel, the vertical beads are crashed to absorb the impact. The side-sill outer panel and the side-sill inner panel, each including the vertical bead, do not need another component for impact absorption such as a deformable member, whereby this configuration enables reduction in number of components and number of assembly steps. Thus, in this vehicle lower-body structure according to the present application, the structure of a joint between the front pillar and the side sill can be simplified, thereby enabling weight reduction and productivity enhancement.

The vertical bead of the side-sill inner panel may have a smaller bead width in the front-rear direction than the vertical bead of the side-sill outer panel.

In this configuration, the vertical bead of the side-sill inner panel has a smaller bead width in the front-rear direction than the vertical bead of the side-sill outer panel. This configuration can render the side-sill inner panel, disposed on the vehicle interior side, less likely to be deformed than the side-sill outer panel. Thus, in case of a crash, the side sill can be deformed so as to be bent toward the vehicle exterior.

The vertical bead of the side-sill outer panel may continuously extend at least from an upper wall to a side wall of the side-sill outer panel and the vertical bead of the side-sill inner panel may continuously extend at least from an upper wall to a side wall of the side-sill inner panel.

In this configuration, each vertical bead continuously extends from the upper wall to the side wall of the side-sill outer panel or from the upper wall to the side wall of the side-sill inner panel. Thus, when, in case of a narrow offset crash, a wheel is pressed rearward and imposes an impact load on the front surface of a joint between the side sill and the front pillar, the vertical beads extending from the upper wall to the side wall are crashed in the front-rear direction, so that the impact load can be absorbed.

The reinforcement member may include a stiffener, disposed on the side-sill inner panel, a reinforcing gusset, disposed at a joint between the front-pillar inner panel and the side-sill inner panel, or the stiffener and the reinforcing gusset.

In this configuration, at least one of the stiffener, disposed at the front portion of the side sill, and the reinforcing gusset is disposed on the side-sill inner panel. Thus, a portion of the side sill located to the rear of the vertical beads is strengthened, so that the cabin is less likely to be deformed in case of a crash, such as a narrow offset crash.

The reinforcement member may include at least the stiffener having an L shape in a sectional view. The stiffener may be joined to an upper wall and a side wall of the side-sill inner panel from a vehicle exterior side along a ridgeline defined by the upper wall and the side wall. The side-sill inner panel may include a horizontal bead below the stiffener, the horizontal bead extending in the front-rear direction.

In this configuration, the stiffener serving as a reinforcement member is joined to the upper wall and the side wall of the side-sill inner panel along a ridgeline defined by the upper wall and the side wall. Thus, the stiffener enhances the strength in the axial direction in cooperation with the horizontal beads to reduce deformation of the cabin. Since the stiffener is capable of enhancing the strength, the weight can be reduced as a result of thinning the entirety.

The reinforcement member may include at least the reinforcing gusset. The front-pillar inner panel may include a corner flange, disposed along a lower front corner of a door opening, and a swell portion, which curves out along the corner flange. The reinforcing gusset may have a substantially quadrangular pyramid shape so as to cover the vehicle interior side of the swell portion.

In this configuration, the reinforcing gusset is disposed so as to cover the swell portion on the front-pillar inner panel. Thus, the cross-sectional area of the joint between the front-pillar inner panel and the side-sill inner panel can be increased. The bonding strength at the joint between the front-pillar inner panel and the side-sill inner panel can thus be enhanced, so that the front pillar is prevented from falling into the cabin or to the vehicle rear when a wheel hits against the front pillar in case of a narrow offset crash.

The reinforcement member may include at least the reinforcing gusset. The front-pillar inner panel may be joined to a jack-up plate below the reinforcing gusset.

In this configuration, the front-pillar inner panel is joined to the jack-up plate below the reinforcing gusset. Thus, the front pillar can fully support the load imposed thereon in a jacking-up operation.

A lower end of the front-pillar outer panel may be joined to an upper wall of the side-sill outer panel and an upper portion of a side wall of the side-sill outer panel. An opening may be formed at a front end of the side sill. The opening may be closed by a side outer panel.

In this configuration, the side-sill outer panel is a decorative part and has lower strength than the front-pillar outer panel constituting a vehicle body frame. Thus, the front end of the side sill has low strength and is easily crushable, whereby the front, end can easily absorb the impact imposed thereon in case of a crash.

For example, the vehicle lower-body structure according to the present application highly absorbs an impact imposed thereon in a narrow offset crash, achieves weight reduction, and has high productivity.

BRIEF DESCRIPTION OF THE DRAWINGS

The advantages of the disclosure will become apparent, in the following description taken in conjunction with the following drawings.

DETAILED DESCRIPTION

Referring now to FIG. 1 to FIG. 13, an example of a vehicle lower-body structure according to an embodiment is described below.

Here, the direction of vehicle travel is represented as "forward", the direction reverse to the vehicle travel is represented as "rearward", an upper part of the vertical direction is represented as "upward", a lower part of the vertical direction is represented as "downward", and the vehicle width direction is represented as "leftward" and/or "rightward". Hereinbelow, the present application is described using a passenger car as an example, the passenger car including a door opening 1*a* for a front side door at a vehicle front portion 1*b* of a vehicle body 1.

Vehicle

Figure 1:
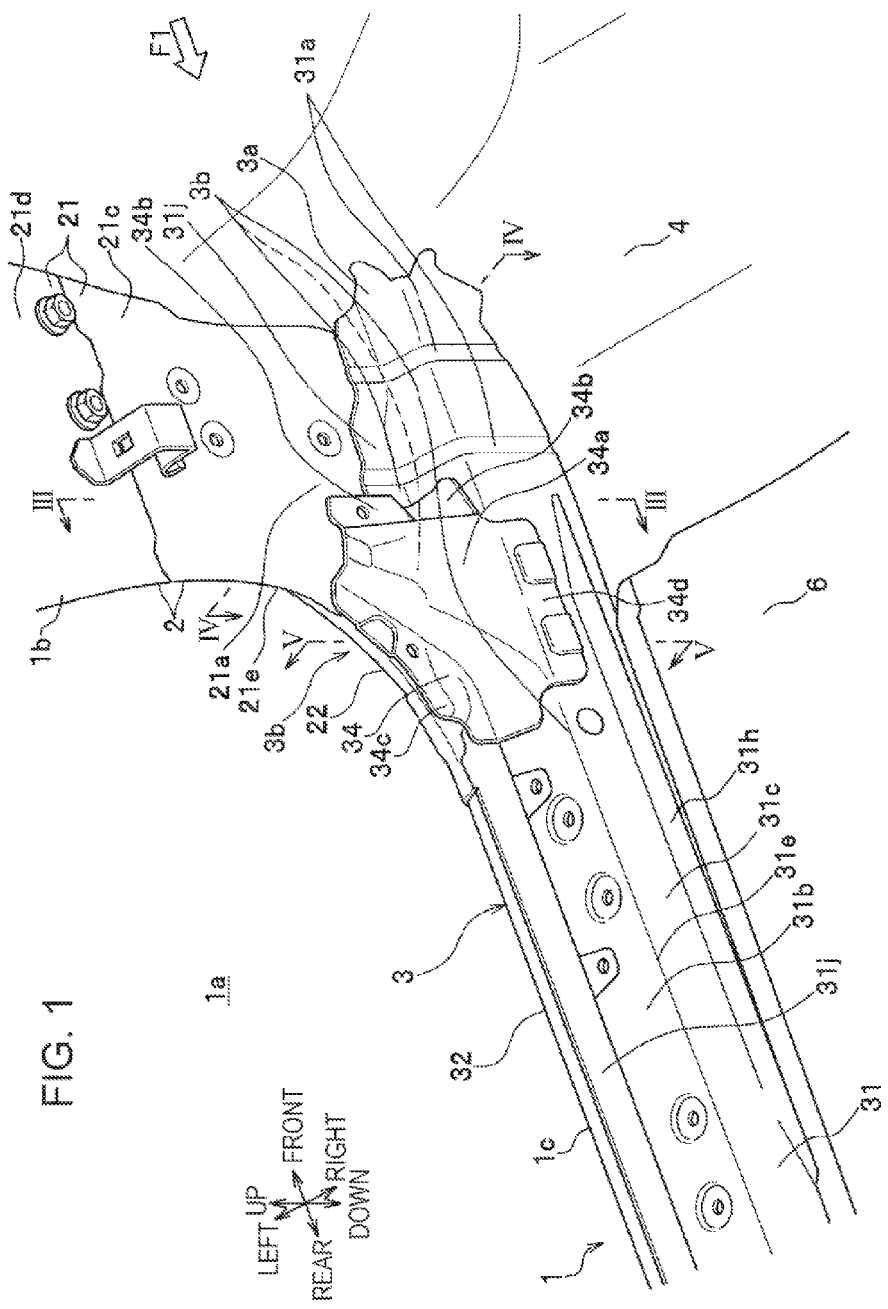
FIG. 1 illustrates an example of a vehicle lower-body structure according to an embodiment and is a perspective view of a main portion of a joint at which a front pillar and a side sill are joined together.

As illustrated in FIG. 1, a vehicle will suffice if it includes a door (not illustrated), movably supported at a left or right vehicle front portion 1b of a vehicle body 1, a door opening 1a, at which the door is disposed so as to be freely opened and closed, a front pillar 2, forming a front frame portion of the door opening 1a, and a side sill 3, forming a lower frame portion of the door opening 1a. In other words, the vehicle only has to include a front pillar 2 and a side sill 3 at a vehicle side portion and the form and the type of the front pillar or the side sill are not limited to particular ones.

Vehicle Body

As illustrated in FIG. 1, examples of components disposed in a vehicle lower portion 1c around door openings 1a of the vehicle body 1 include side sills 3, front pillars 2, a dash lower panel 4, outriggers 5 (see FIG. 2), a floor frame 8, a floor panel 6, and a floor cross member 9 (see FIG. 6), which are arranged substantially bilaterally symmetrically. Since the vehicle lower portion 1c has a substantially bilaterally symmetrical configuration, a left side of the vehicle body 1 is mainly described below and description of a right side of the vehicle body 1 is omitted as appropriate.

Front Pillar

The front pillar 2 is a frame member constituting a front frame portion of the door opening 1a and a side frame portion of the windshield. The front pillar 2 includes a front-pillar outer panel 22, disposed on the vehicle exterior side, and a front-pillar inner panel 21, disposed on the vehicle interior side, which are joined so as to be superposed one on the other in a vehicle width direction to define a closed section extending vertically. The front pillar 2 is joined to a front portion 3a of the side sill 3 and extends from the front portion 3a to the front of the windshield (not illustrated), disposed above. A front-wheel-house upper member and a front wheel house, not illustrated, are disposed in front of the front pillar 2. A door-hinge attachment stiffener 23 and a bulkhead piece 24 are disposed inside the closed section of the front pillar 2. The door-hinge attachment stiffener 23 is used for attaching a door hinge, which supports a front side door (not illustrated) while allowing the front side door to be freely opened and closed. The bulkhead piece 24 improves the flexural rigidity of the front pillar 2.

Front-Pillar Inner Panel

Figure 3:
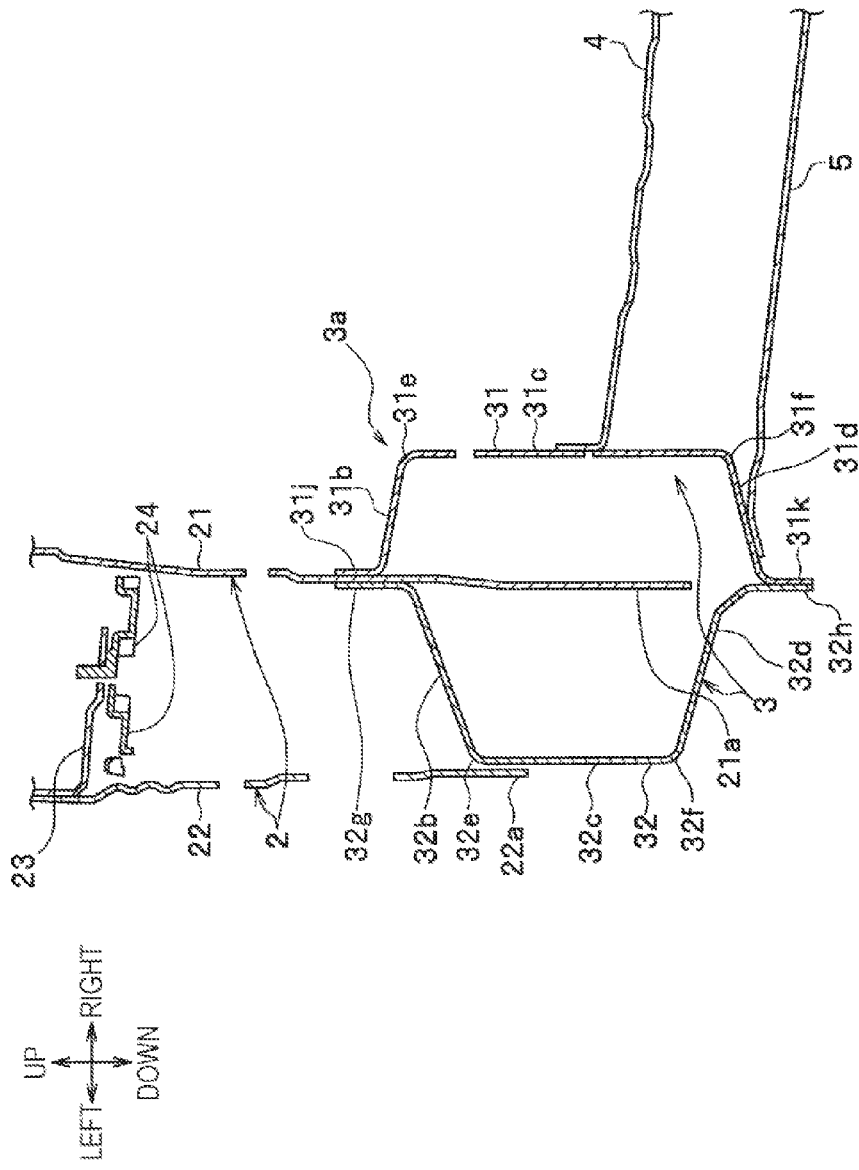
FIG. 3 is a sectional view of the vehicle lower-body structure taken along line III-III of FIG. 1.
Figure 5:
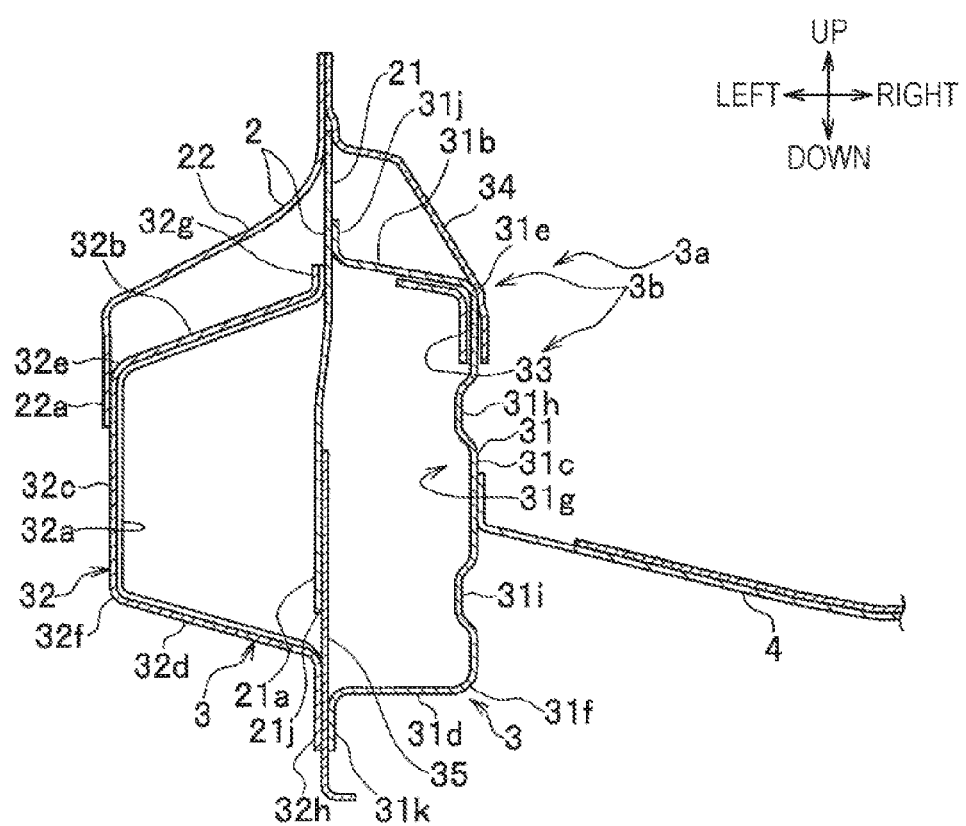
FIG. 5 is a sectional view of the vehicle lower-body structure taken along line V-V of FIG. 1.
Figure 12:
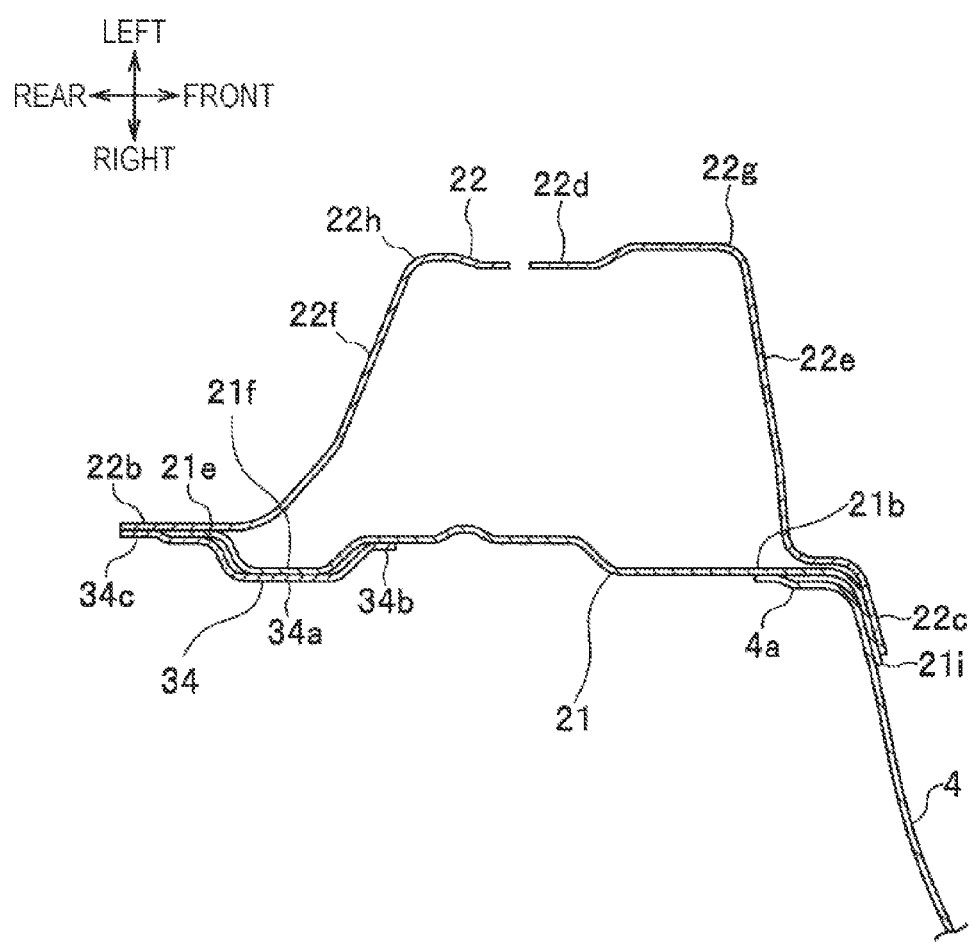
FIG. 12 is an enlarged sectional view of the joint taken along line XII-XII of FIG. 11.

As illustrated in FIG. 3 and FIG. 5, the front-pillar inner panel 21 is held between and joined to a side-sill outer panel 32 and a side-sill inner panel 31 in a vertical sectional view. As illustrated in FIG. 5, a lower end portion 21a of the front-pillar inner panel 21 is joined to a jack-up plate 35, described below, inside a hollow portion of the side sill 3. As illustrated in FIG. 12, the front-pillar outer panel 22 and the dash lower panel 4 are welded and joined to a front end portion 21b of the front-pillar inner panel 21.

Figure 7:
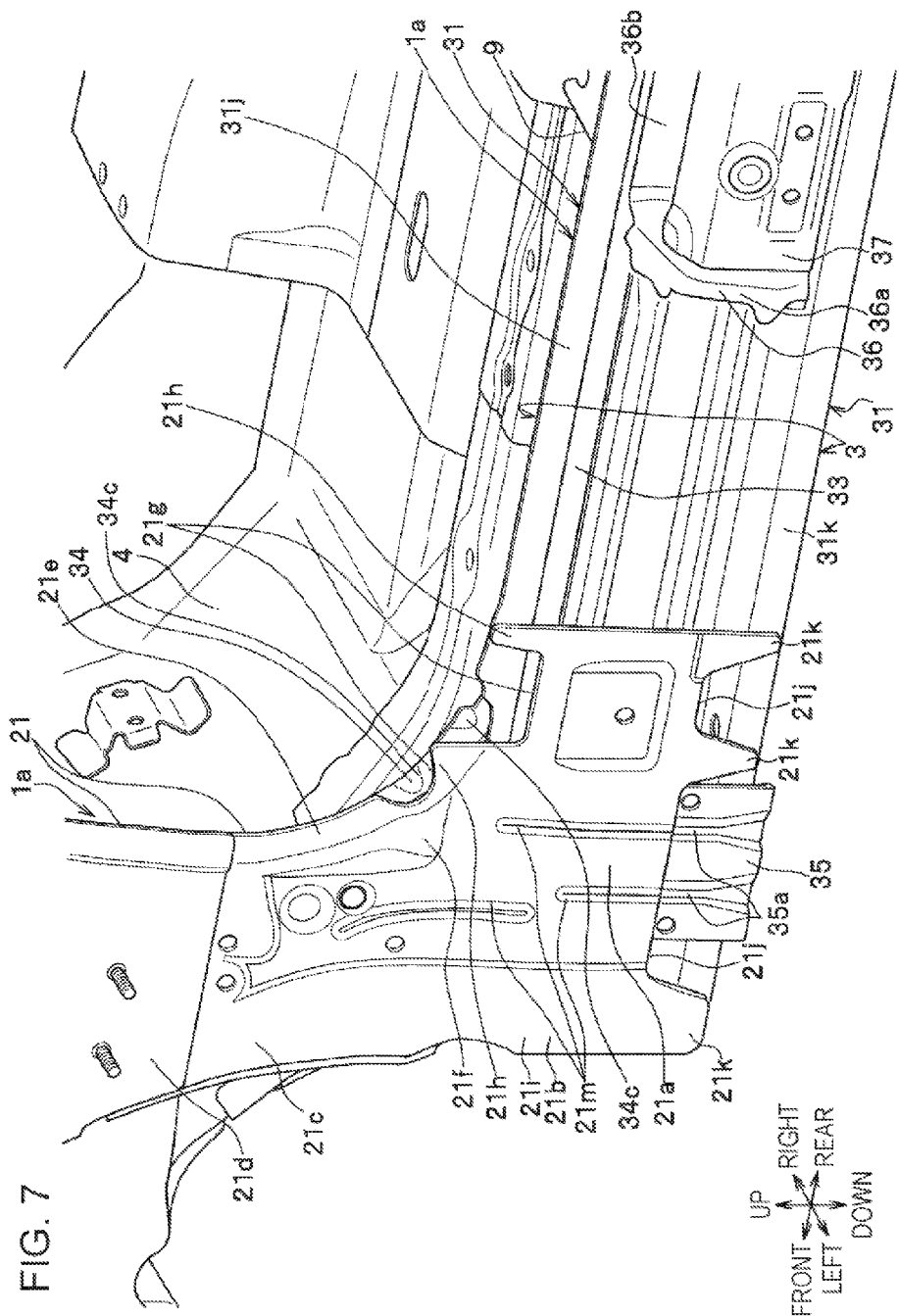
FIG. 7 is an enlarged perspective view of a main portion of a joint at which the front-pillar inner panel and the side-sill inner panel are joined together.
Figure 8:
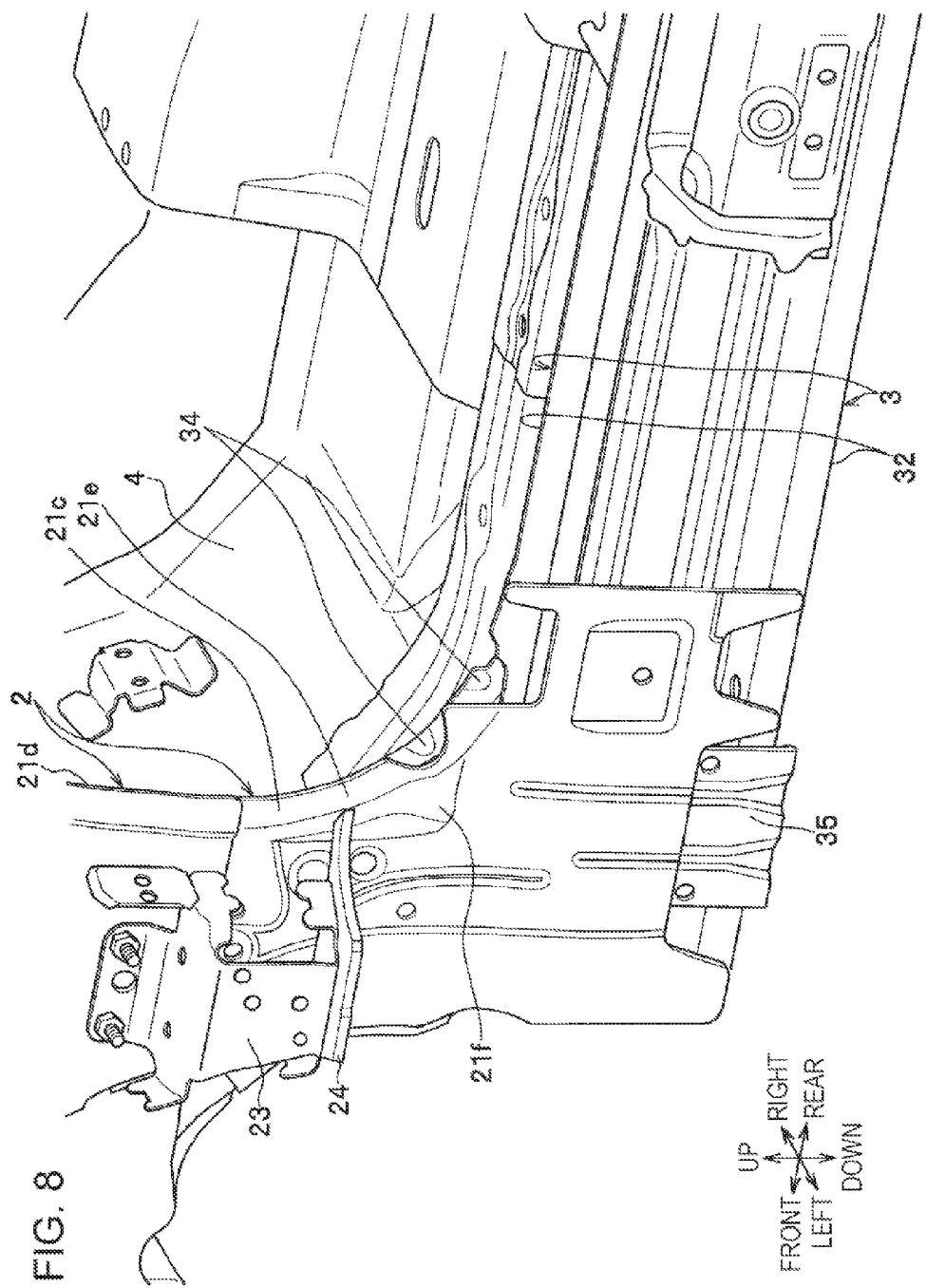
FIG. 8 is a schematic, perspective view of a main portion at which a bulkhead is attached.

As illustrated in FIG. 7, the front-pillar inner panel 21 is a metal plate member formed by joining a lower pillar inner panel 21c, constituting a lower part, and an upper pillar inner panel 21d, constituting an upper part, together. The lower pillar inner panel 21c has a substantially L shape in a side view.

A corner flange 21e having an arc shape in a side view is disposed at an edge portion of the lower pillar inner panel 21c facing the door opening 1a. A swell portion 21f, curving out toward the vehicle interior, is disposed in front of and near a middle portion of the corner flange 21e. The corner flange 21e also has two cuts 21g, one of which is larger than the other and which are shaped like grooves in a side view. In front and rear of the rear larger cut 21g, two tongue-shaped protruding pieces 21h are disposed.

Three protruding pieces 21k are disposed at the lower edge of the lower pillar inner panel 21c while being spaced apart from one another in the front-rear direction. Two cuts 21j, one of which is larger than the other and which are shaped like grooves in a side view, are disposed between the three protruding pieces 21k.

Three pillar-inner vertical beads 21m extend vertically in a substantially middle portion of the lower pillar inner panel 21c in the front-rear direction. Each pillar-inner vertical bead 21m is a reinforcement member having a substantially U-shaped groove shape (arc shape) in a cross-sectional view.

Front-Pillar Outer Panel

As illustrated in FIG. 3 and FIG. 5, the front-pillar outer panel 22 is a member that constitutes an outer surface of the front pillar 2. A lower end portion 22a of the front-pillar outer panel 22 is joined to the outer surface of the side-sill outer panel 32.

Figure 11:
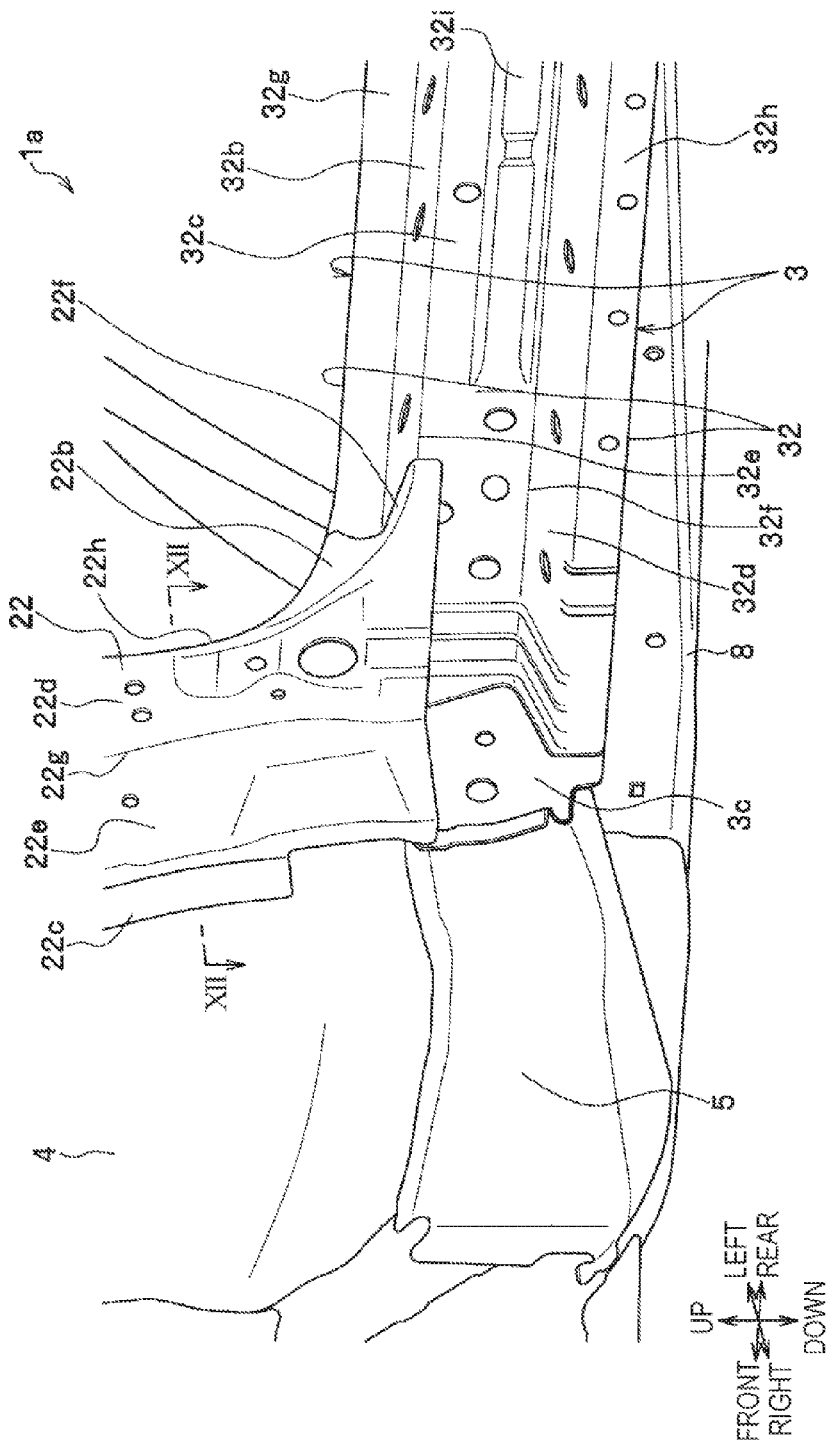
FIG. 11 is an enlarged perspective view of a main portion of a joint at which the front-pillar outer panel and the side-sill outer panel are joined together.

As illustrated in FIG. 11 and FIG. 12, the front-pillar outer panel 22 is a metal plate member having a substantially recessed shape in a cross-sectional view. The front-pillar outer panel 22 mainly includes a side wall 22d, a front wall 22e, extending from the front end of the side wall 22d and bent toward the vehicle interior, and a rear wall 22f, extending from the rear end of the side wall 22d and bent toward the vehicle interior. In the lower end portion 22a of the front-pillar outer panel 22, the side wall 22d and the rear wall 22f are curved so as to extend rearward in a side view.

A corner flange 22b of the front-pillar outer panel 22 having substantially an arc shape in a side view extends in a curve at an edge portion of the rear wall 22f facing the door opening 1a. At an end portion of the front wall 22e facing the vehicle interior, a front flange 22c, cranked in a cross-sectional view, extends toward the vehicle interior.

A ridgeline 22g is defined by the side wall 22d and the front wall 22e. A ridgeline 22h is defined by the side wall 22d and the rear wall 22f. The ridgeline 22h is curved along the corner portion of the door opening 1a. The ridgelines 22g and 22h function as reinforcing members that reinforce the joint between the front pillar 2 and the side sill 3.

Side Sill

The side sill 3 illustrated in FIG. 1 is a frame member extending in the front-rear direction from the lower end portion of the front pillar 2 to the front end of a rear wheel house (not illustrated). The side sill 3 is formed by joining the side-sill inner panel 31, disposed on the vehicle interior side, and the side-sill outer panel 32, disposed on the vehicle exterior side, so that the side-sill inner panel 31 and the side-sill outer panel 32 are superposed one on the other in the vehicle width direction. Thus, the side sill 3 has a hollow structure having a substantially rectangular shape (a shape that forms a closed section) in a vertical sectional view.

Side-Sill Inner Panel

As illustrated in FIG. 1 or FIG. 3, the side-sill inner panel 31 is an inner half of the side sill 3 closer to the cabin and has a substantially hat shape in a vertical sectional view. The side-sill inner panel 31 mainly includes an upper wall 31b, a side wall 31c, a lower wall 31d, and an upper flange 31j and a lower flange 31k, which respectively extend from vehicle-exterior end portions of the upper wall 31b and the lower wall 31d and are respectively bent, upward and downward. Ridgelines 31e and 31f respectively extend in the front-rear direction at the boundary between the upper wail 31b and the side wall 31c and the boundary between the side wall 31c and the lower wall 31d.

As illustrated in FIG. 1, the side-sill inner panel 31 includes vertical beads 31a and a horizontal bead 31h. The vertical bead 31a and the horizontal bead 31h are described below.

Side-Sill Outer Panel

As illustrated in FIG. 3, the side-sill outer panel 32 is an outer half of the side sill 3 closer to the vehicle exterior and has a substantially hat shape in a vertical sectional view. The side-sill outer panel 32 is substantially symmetric with the side-sill inner panel 31 in a vertical sectional view. As illustrated in FIG. 5, the side-sill outer panel 32 mainly includes a vertical bead 32a, an upper wall 32b, a side wall 32c, a lower wall 32d, and an upper flange 32g and a lower flange 32h, extending from vehicle-interior end portions of the upper wall 32b and the lower wall 32d and respectively bent upward and downward. Ridgelines 32e and 32f respectively extend in the front-rear direction at the boundary between the upper wall 32b and the side wall 32c and the boundary between the side wall 32c and the lower wall 32d. A horizontal bead 32i, which is a substantially recessed groove extending in the front-rear direction, is formed in a middle portion of the side wall 32c.

Figure 9:
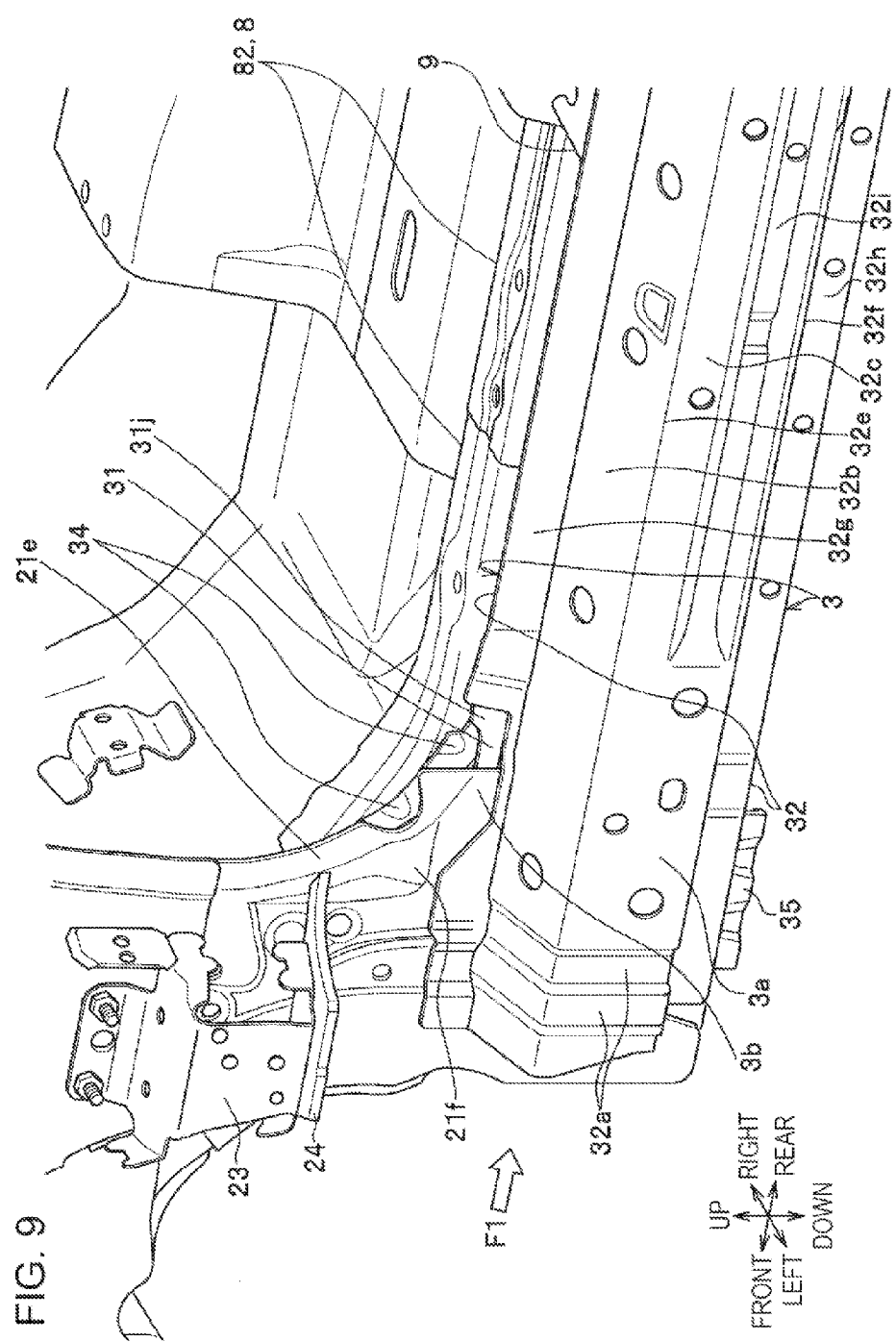
FIG. 9 is a perspective view of a main portion at which a side-sill outer panel is attached.
Figure 10:
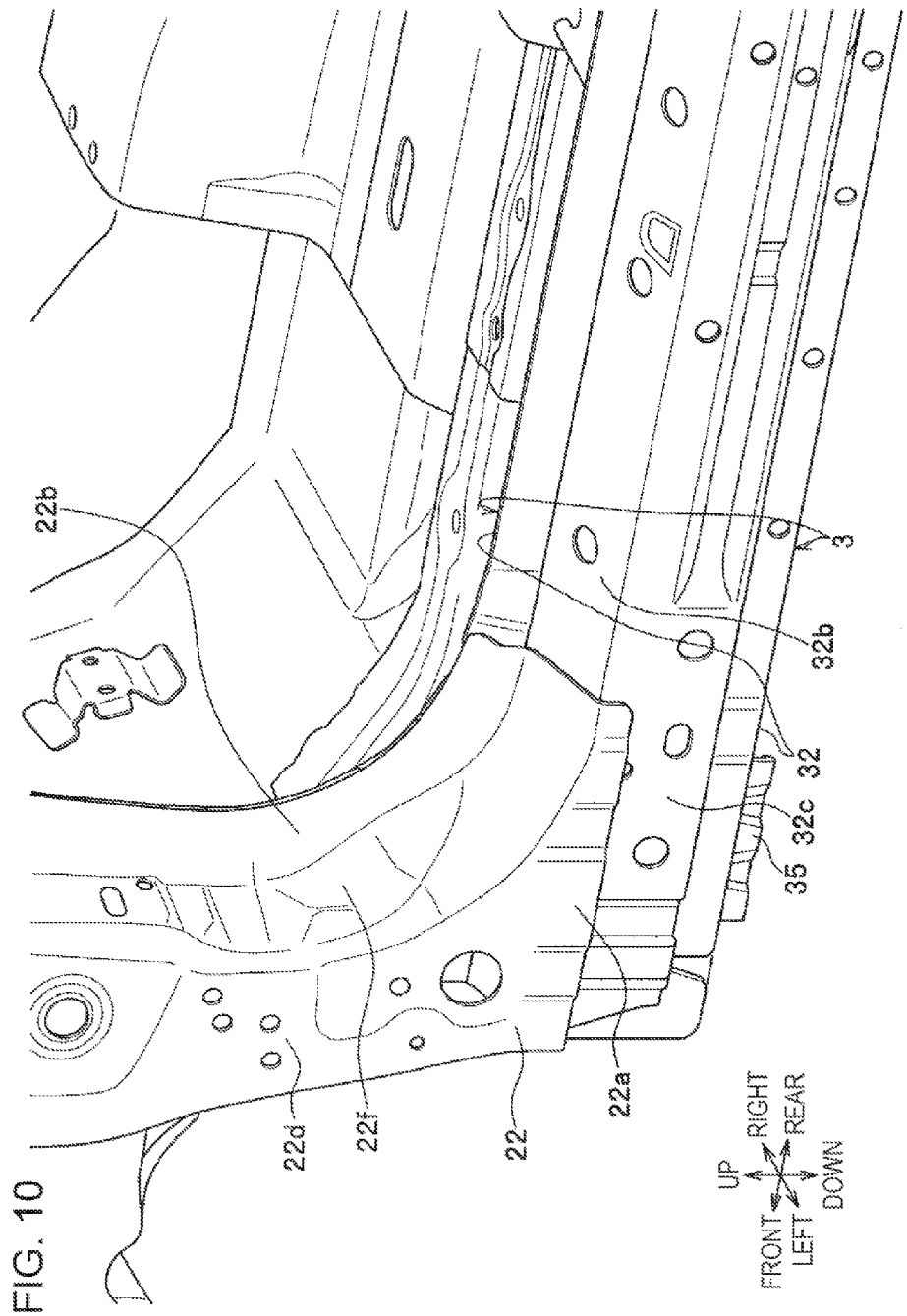
FIG. 10 is a perspective view- of a main portion at which a front-pillar outer panel is attached.

As illustrated in FIG. 9, the side-sill outer panel 32 also includes vertical beads 32a. The vertical beads 32a are described below.

Subsequently, a structure of a joint between the front pillar 2 and the side sill 3 is described.

As illustrated in FIG. 3 and FIG. 5, the lower pillar inner panel 21c is held between and joined to the upper flange 31j of the side-sill inner panel 31 and the upper flange 32g of the side-sill outer panel 32.

As illustrated in FIG. 7, the three protruding pieces 21k disposed at the lower end of the lower pillar inner panel 21c are held between and joined to the lower flange 31k of the side-sill inner panel 31 and the lower flange 32h of the side-sill outer panel 32. In addition, as illustrated in FIG. 5, the lower end portion of the jack-up plate 35 is held between and joined to the lower flange 31k of the side-sill inner panel 31 and the lower flange 32h of the side-sill outer panel 32. The jack-up plate 35 is disposed at a position corresponding to the cut 21j of the lower pillar inner panel 21c.

As illustrated in FIG. 12, a front flange 21i is disposed at the front end of the lower pillar inner panel 21c so as to be bent toward the vehicle interior. The front flange 21i is held between and joined to the front flange 22c of the front-pillar outer panel 22 and the dash lower panel 4. An outer flange 4a of the dash lower panel 4 is joined to the lower pillar inner panel 21c.

As illustrated in FIG. 12, a corner flange 21e of the lower pillar inner panel 21c is held between and joined to the corner flange 22b of the front-pillar outer panel 22 and a gusset-rear flange 34c of a reinforcing gusset 34, described below.

As illustrated in FIG. 3, FIG. 4, FIG. 5, and FIG. 11, the side wall 22d of the front-pillar outer panel 22 is joined to the side wall 32c of the side-sill outer panel 32. The rear wall 22f of the front-pillar outer panel 22 is joined to the upper wall 32b of the side-sill outer panel 32.

Reinforcement Member

As illustrated in FIG. 1, FIG. 5, and FIG. 12, a reinforcement member 3b is disposed at a lower front corner portion of the door opening 1a. The reinforcement member 3b includes a swell portion 21f, disposed on the lower pillar inner panel 21c, a reinforcing gusset 34, covering the vehicle interior side of the swell portion 21f, and a stiffener 33, disposed along the ridgeline 31e of the side-sill inner panel 31. The reinforcement member 3b reinforces a lower front corner portion of the door opening 1a, that is, a joint between the front pillar 2 and the side sill 3. As illustrated in FIG. 12, the swell portion 21f is formed in a groove shape in a cross-sectional view. As illustrated in FIG. 7, the swell portion 21f is formed in a trapezoidal shape in a front view and curves out toward the vehicle interior in a substantially triangular shape in a vertical sectional view. Other portions of the reinforcement member 3b are described in detail below.

Vertical Beads

Figure 4:
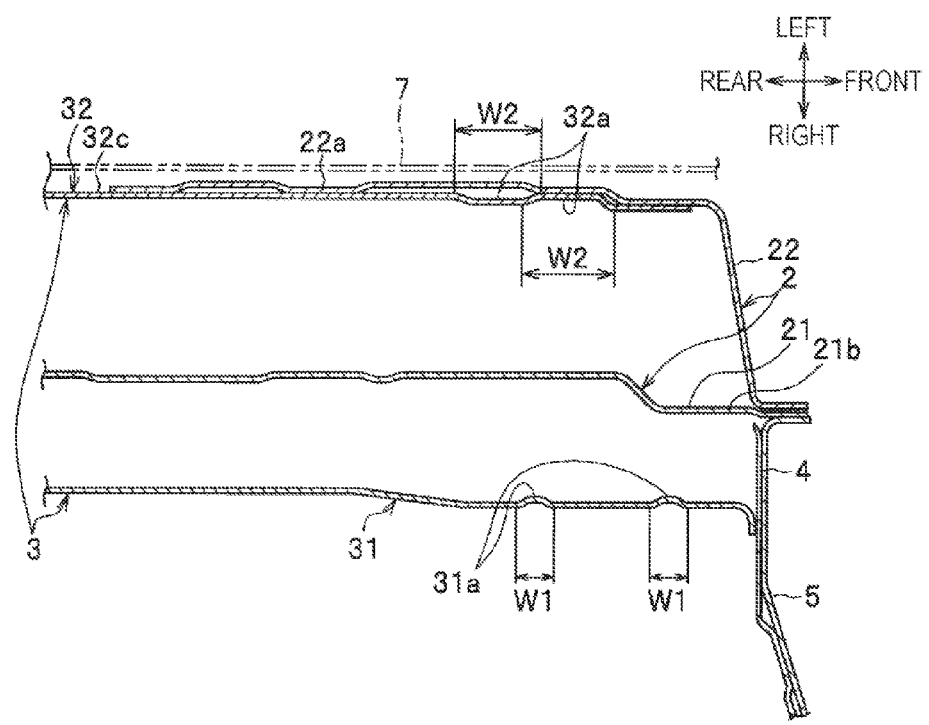
FIG. 4 is a sectional view of the vehicle lower-body structure taken along line IV-IV of FIG. 1.

As illustrated in FIG. 1, FIG. 4, and FIG. 9, the side-sill inner panel 31 and the side-sill outer panel 32 each include multiple vertical beads 31a or 32a in front of the reinforcement member 3b and below the front pillar 2.

The vertical beads 31a extend vertically from the upper flange 31j of the side-sill inner panel 31 to the side wall 31c through the upper wall 31b. Each vertical bead 31a has a substantially U-shaped groove shape (arc shape) in a cross-sectional view. Multiple (for example, two) vertical beads 31a are formed in the front portion 3a of the side sill 3 at an appropriate interval therebetween. Each vertical bead 31a suffices if it extends at least from the upper wall 31b to the side wall 31c.

The vertical beads 32a extend vertically from the upper flange 32g of the front portion 3a of the side sill 3 to the side wall 32c through the upper wall 32b, one of the beads being recessed with respect, to the vehicle exterior and the other bead being protruding toward the vehicle exterior in a cross-sectional view. The vertical beads 32a suffice if they extend at least from the upper wall 32b to the side wall 32c.

As illustrated in FIG. 4, the bead width W1 of each vertical bead 31a of the side-sill inner panel 31 in the front-rear direction is smaller than the bead width W2 of the vertical bead 32a of the side-sill outer panel 32 in the front-rear direction.

As illustrated in FIG. 5, horizontal beads 31h and 31i are substantially recessed grooves extending parallel to each other in the front-rear direction at two positions, that is, above and below a flange 4a of the dash lower panel 4 attached to the side wall 31c.

Subsequently, a specific configuration of the reinforcement member 3b disposed at the lower front corner of the door opening 1a is described.

Stiffener

Figure 6:
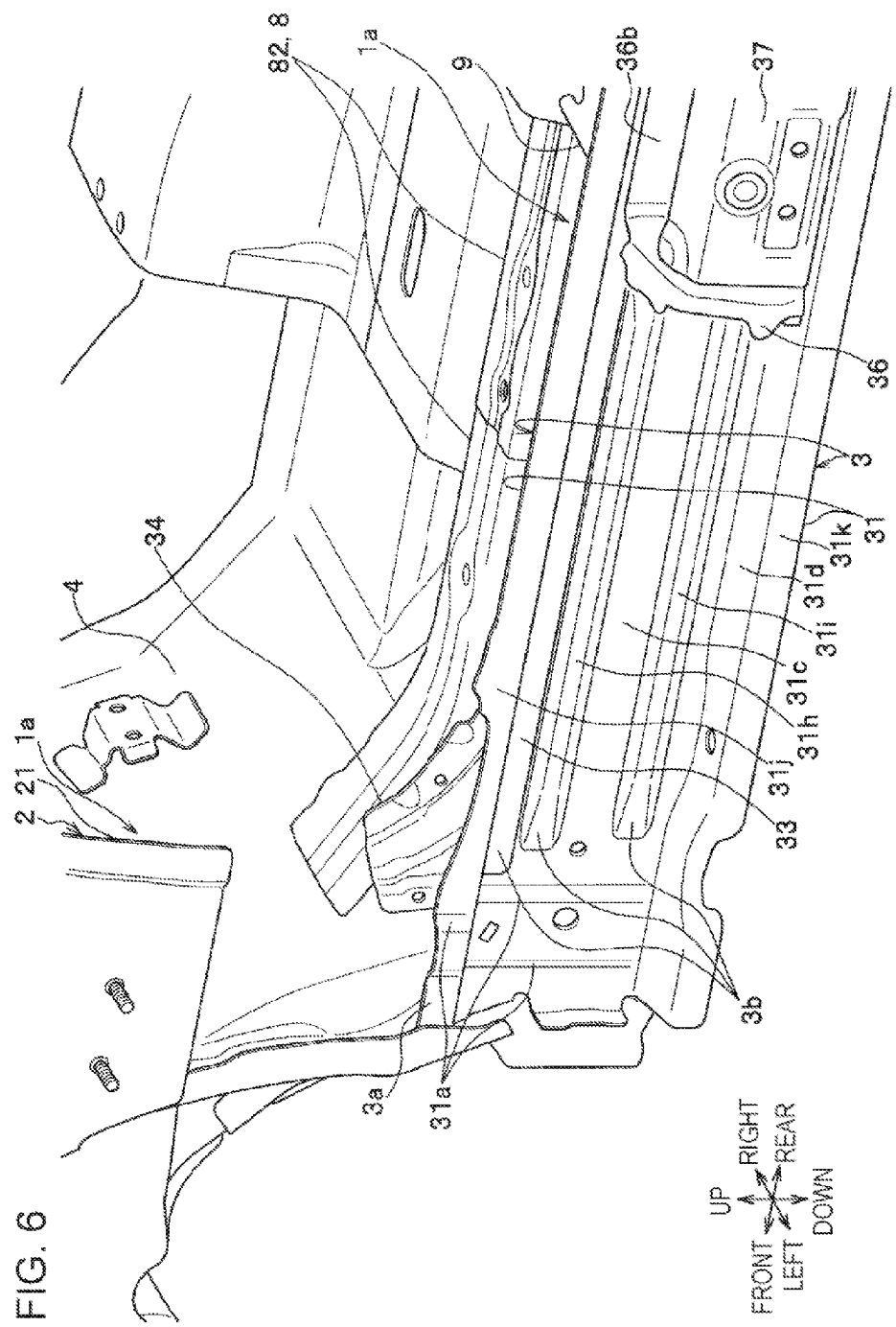
FIG. 6 is a schematic, perspective view of a main portion at which a side-sill inner panel is attached.

As illustrated in FIG. 5, the stiffener 33 is a metal reinforcement plate having a substantially L shape in a vertical sectional view and extending in the front-rear direction (see FIG. 6). The stiffener 33 is joined to the upper wall 31b and the side wall 31c of the side-sill inner panel 31 from the vehicle exterior side along the ridgeline 31e defined by the upper wall 31b and the side wall 31c. The stiffener 33 is disposed above the horizontal bead 31h formed in the side wall 31c of the side-sill inner panel 31 and extending in the front-rear direction.

Reinforcing Gusset

As illustrated in FIG. 1, the reinforcing gusset 34 is a metal plate member disposed at a joint between the front-pillar inner panel 21 and the side-sill inner panel 31 to reinforce the joint. The reinforcing gusset 34 includes a protruding portion 34a, covering the swell portion 21f (see FIG. 7 and FIG. 12), a gusset-front flange 34b, disposed in front of the protruding portion 34a, a gusset-rear flange 34c, located to the rear of the protruding portion 34a, and a gusset-lower flange 34d, disposed below the protruding portion 34a. The reinforcing gusset 34 is superposed on and joined to the corner flange 21e of the lower end portion 21a of the front-pillar inner panel 21 and the upper flange 31j, the upper wall 31b, and the side wall 31c of the side-sill inner panel 31 from the vehicle interior side. The reinforcing gusset 34 has a substantially quadrangular pyramid shape in a side view so as to cover the vehicle interior side of the swell portion 21f (see FIG. 7), formed along the corner flange 21e of the front-pillar inner panel 21 facing the door opening 1a.

The protruding portion 34a is shaped so as to protrude toward the vehicle interior in a cross-sectional view so as to cover the periphery of the swell portion 21f (see FIG. 7) of the front-pillar inner panel 21. The protruding portion 34a gradually spreads out from top to bottom in a side view.

The gusset-front flange 34b is superposed on and joined to the lower end portion 21a of the front-pillar inner panel 21 and the upper flange 31j and the upper wall 31b of the side-sill inner panel 31 from the vehicle interior side.

The gusset-rear flange 34c is superposed on and joined to the corner flange 21e of the front-pillar inner panel 21 and the upper flange 31j and the upper wall 31b of the side-sill inner panel 31 from the vehicle interior side.

The gusset-lower flange 34d is superposed on and joined to the side wall 31c of the side-sill inner panel 31 from the vehicle interior side.

Jack-up Plate

As illustrated in FIG. 7, the jack-up plate 35 includes jack-up beads 35a, extending vertically, for reinforcement against a vertical load. The jack-up plate 35 is made of a metal plate member relatively vulnerable to a front-rear load so as to be crashed in case of a narrow offset crash to facilitate absorption of the impact load F1. As illustrated in FIG. 5 and FIG. 7, the jack-up plate 35 is disposed so as to extend from the vehicle interior side of the lower end portion 21a of the front-pillar inner panel 21 to the lower flange 31k of the side-sill inner panel 31. The lower end portion of the jack-up plate 35 is held between and joined to the side-sill-inner lower flange 31k and the side-sill-outer lower flange 32h at a portion within the cut 21j.

Bulkhead and Side-Sill Reinforcing Frame

As illustrated in FIG. 7, a bulkhead 36 is a reinforcement, member made of a metal plate and partitioning the hollow portion of the side sill 3 into a front portion and a rear portion. The bulkhead 36 is disposed in the hollow portion of the side sill 3 while being spaced apart to the rear from the rear end portion of the front-pillar inner panel 21. The bulkhead 36 prevents the side-sill inner panel 31 and the side-sill outer panel 32 from being separated from each other in case of a narrow offset crash. The bulkhead 36 includes a partitioning surface 36a, disposed so as to partition the space inside the side-sill inner panel 31 into a front portion and a rear portion, and a joint 36b, bent from the outer periphery of the partitioning surface 36a and extending in the front-rear direction.

A side-sill reinforcing frame 37 is a reinforcement member disposed inside the side sill 3 so as to extend to the rear from the partitioning surface 36a.

Side Outer Panel

Figure 13:
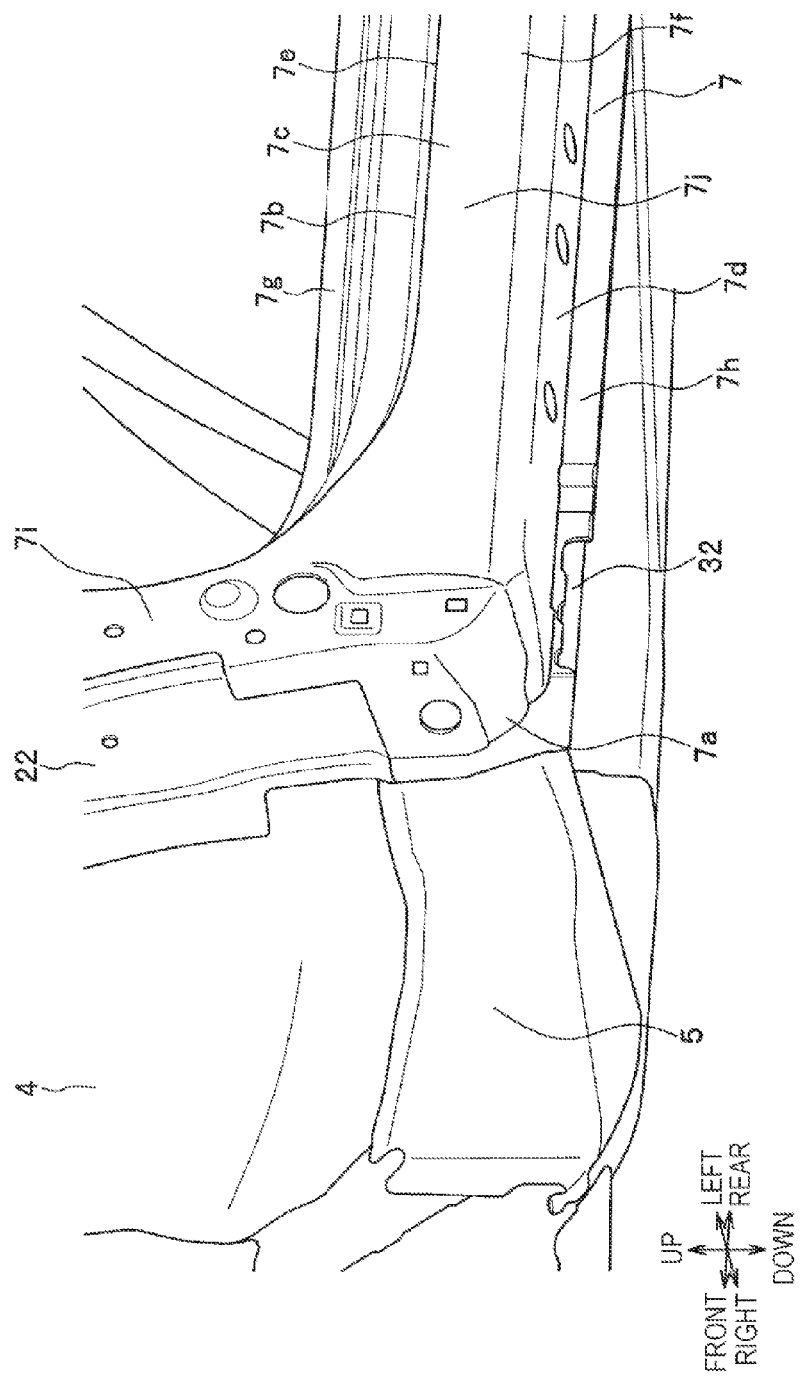
FIG. 13 is a perspective view of a main portion at which a side outer panel is attached.

As illustrated in FIG. 13, a side outer panel 7 is a member that dresses the vehicle exterior side of the joint between the front pillar 2 and the side sill 3. The side outer panel 7 includes a front-pillar covering portion 7i, covering the front-pillar outer panel 22 from the vehicle exterior side, and a side-sill covering portion 7j, extending to the rear from a lower end of the front-pillar covering portion 7i and covering the vehicle exterior side of the side-sill outer panel 32. Thus, the side outer panel 7 has a substantially L shape as a whole in a side view. The side outer panel 7 is made of a material having a smaller thickness and lower strength than the front-pillar outer panel 22.

The side-sill covering portion 7j has a substantially hat shape in a vertical sectional view. The side-sill covering portion 7j includes an upper wall 7b, a side wall 7c, a lower wall 7d, a side-outer upper flange 7g, and a side-outer lower flange 7h. Ridgelines 7e and 7f extending in the front-rear direction are respectively defined by the upper wall 7b and the side wall 7c and by the lower wall 7d and the side wall 7c. A front wall 7a bent toward the vehicle interior so as to close an opening 3c (see FIG. 11) is disposed at the front end portion of the side-sill covering portion 7j. The vehicle-exterior-side end portion of the front wall 7a is continuous with the side wall 7c and the lower end portion of the front wall 7a is continuous with the lower wall 7d.

Dash Lower Panel

As illustrated in FIG. 1, the dash lower panel 4 is a member made of a material such as a steel plate forming part of a partitioning wall that separates a motor room and the cabin. The vehicle-exterior-side end portion of the dash lower panel 4 is joined to the front end portion 21b of the front-pillar inner panel 21, the side wall 31c of the side-sill inner panel 31, and the front portion 3a of the side sill 3. The lower end portion of the dash lower panel 4 is joined to the front end portion of the floor panel 6.

Outrigger

Figure 2:
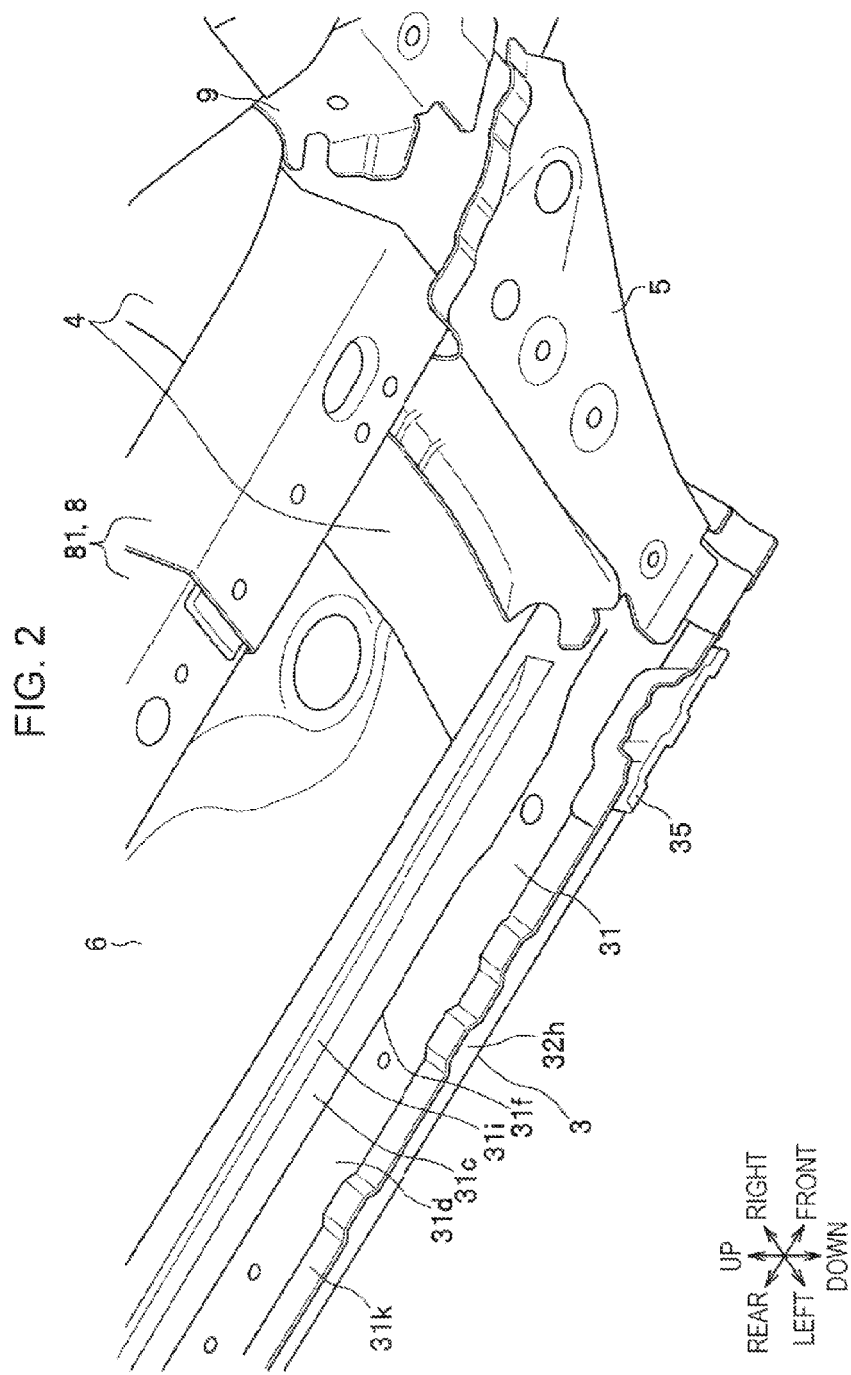
FIG. 2 is a perspective view of a main portion at which a front end portion of the side sill is disposed.

As illustrated in FIG. 2, the outrigger 5 is a frame member connected to the vehicle interior side of the front portion 3a of the side-sill inner panel 31 and the vehicle exterior side of the front end portion of the floor frame 8. The outrigger 5 forms a closed section in cooperation with the dash lower panel 4.

Floor Panel, Floor Frame, and Floor Cross Member

The floor panel 6 illustrated in FIG. 1 is a metal plate member forming a floor surface of the cabin. The floor panel 6 stretches between the side sills 3 and tunnel portions (not illustrated).

The floor frame 8 illustrated in FIG. 2 includes a floor-frame body 81, which holds the floor panel 6 from below and has a substantially hat shape in a vertical sectional view, and an upper frame 82 (see FIG. 6), which is mounted on the floor panel 6 and has a substantially hat shape in a vertical sectional view. The floor frame 8 has its front end connected to, for example, the rear portion of the front side frame (not illustrated) and its rear end connected to, for example, the floor cross member 9.

The floor cross member 9 illustrated in FIG. 6 is a frame member having a substantially hat shape in a vertical sectional view and stretching between the left and right side sills 3 and tunnel portions (not illustrated).

Effects of Vehicle Lower-Body Structure

Referring now to FIG. 1 to FIG. 13, effects of the vehicle lower-body structure according to an embodiment are described by taking, as an example, a case where a vehicle causes a narrow offset crash with an oncoming car at the vehicle front left portion.

As illustrated in FIG. 1, when a vehicle causes a narrow offset crash with an oncoming car, the front portion 3a of the side sill 3 is collapsed by being pressed rearward (in the direction of the impact load F1) by the oncoming car with a front bulkhead, a front side frame, a front-wheel-house upper member, a front wheel house, and a front wheel, which are not illustrated, and the front pillar 2 on the vehicle front left portion interposed therebetween.

The side-sill inner panel 31 and the side-sill outer panel 32 respectively include the vertical beads 31a and 32a, extending vertically, at the front, portion 3a of the side sill 3 in front of the reinforcement, member 3b. Thus, in case of a narrow offset crash, the vertical beads 31a and 32a are crashed in the front-rear direction and thus capable of absorbing the impact load F1. The side-sill inner panel 31 and the side-sill outer panel 32, respectively including the vertical beads 31a and 32a, do not need additional components for impact absorption such as deformable members, whereby this configuration enables reduction in number of components and number of assembly steps. Thus, the structure of a joint between the front pillar 2 and the side sill 3 can be simplified, thereby enabling weight reduction and productivity enhancement.

As illustrated in FIG. 4, the bead width W1 of each vertical bead 31a of the side-sill inner panel 31 is smaller than the bead width W2 of each vertical bead 32a of the side-sill outer panel 32. The vertical beads 31a and 32a are thus capable of preventing the side sill 3 from bending into the cabin as a result of rendering the degree of front-rear deformation of the side-sill inner panel 31, disposed on the vehicle interior side, smaller than the degree of front-rear deformation of the side-sill outer panel 32.

As illustrated in FIG. 1 or FIG. 9, the vertical beads 31a or 32a continuously extend between the upper wall 31b and the side wall 31c of the side-sill inner panel 31 or the upper wall 32b and the side wall 32c of the side-sill outer panel 32. Thus, the ridgelines 31e and 32e extending to the front and rear of the vertical beads 31a and 32a render the vertical beads 31a and 32a more easily crushable in the front-rear direction when, in case of a narrow offset crash, the impact load F1 is imposed on the front surface of the joint between the side sill 3 and the front pillar 2.

As illustrated in FIG. 5, the reinforcement member 3b of the side sill 3 has higher strength and higher rigidity at a portion of the side sill 3 located to the rear of the vertical beads 31a and 32a since the stiffener 33 and the reinforcing gusset 34 are disposed on the side-sill inner panel 31. Thus, the reinforcement member 3b is capable of preventing the cabin from being deformed in case of a crash, such as a narrow offset crash.

The stiffener 33 having an L shape in a sectional view is joined to the upper wall 31b and the side wall 31c from the vehicle exterior side along the ridgeline 31e defined by the upper wall 31b and an inner side wall 31g of the side-sill inner panel 31. The side-sill inner panel 31 includes the horizontal bead 31i, extending in the front-rear direction, below the stiffener 33. Thus, the horizontal bead 31i and the stiffener 33 can enhance the strength in the front-rear direction and reduce deformation of the cabin. The side sill 3 includes the ridgelines 31e, 31f, 32e, and 32f extending continuously in the front-rear direction at the upper and lower end portions of the side walls 31c and 32c. Thus, the impact load F1 is linearly exerted along the ridgelines 31e, 31f, 32e, and 32f, so that the impact load F1 is capable of being transmitted more efficiently. Moreover, the stiffener 33 is capable of enhancing the strength against the impact load F1. Thus, the entirety of the side sill 3 can be thinned for weight reduction.

As illustrated in FIG. 1, the reinforcing gusset 34 of the reinforcement member 3b has a substantially quadrangular pyramid shape so as to cover the vehicle interior side of the swell portion 21f (see FIG. 7 and FIG. 12) of the front-pillar inner panel 21. Thus, a joint between the front-pillar inner panel 21 and the side-sill inner panel 31 can increase a cross-sectional area. The joint between the front-pillar inner panel 21 and the side-sill inner panel 31 can thus have higher coupling strength. This configuration thus prevents, in case of a narrow offset crash, the front pillar 2 from falling into the cabin and toward the vehicle rear when a wheel (not illustrated) hits against the front pillar 2.

As illustrated in FIG. 5, the front pillar 2 can fully support the load imposed in a jacking-up operation since the front-pillar inner panel 21 is joined to the jack-up plate 35 below the reinforcing gusset 34.

As illustrated in FIG. 13, the opening 3c (see FIG. 11) of the side sill 3 at the front end is closed by the side outer panel 7, having lower strength than the front-pillar outer panel 22 forming a vehicle body frame. Thus, the front end of the side sill 3 is easily crushable with lower strength and can thus easily absorb the impact in case of a narrow offset crash.

As illustrated in FIG. 1 and FIG. 9, in the vehicle lower-body structure according to an embodiment, the side-sill inner panel 31 and the side-sill outer panel 32 of the side sill 3 respectively include the ridgelines 31e and 31f and the horizontal beads 31h and 31i and the ridgelines 32e and 32f and the horizontal beads 32i. Thus, the side sill 3 is strengthened against the load in the front-rear direction.

As illustrated in FIG. 1, FIG. 6, and FIG. 7, the reinforcement member 3b of the side sill 3 disposed in the front portion 3a includes the stiffener 33, the reinforcing gusset 34, and the jack-up plate 35, and thus enhances its strength. The vertical beads 31a and 32a are formed in front of the reinforcement member 3b of the side sill 3.

Thus, in case of a narrow offset crash, the side sill 3 absorbs the impact load F1 as a result of the vertical beads 31a and 32a being crashed, so that the portion located to the rear of the vertical beads 31a and 32a is prevented from being deformed.

The present application is not limited to the above-described embodiment and may be modified or changed in various manners within the technical scope of the present application. Naturally, the present application encompasses these modifications or changes.

In the above-described embodiment, a passenger car is described as an example of the present application. The present application, however, is applicable to any vehicle including the front pillar 2 and the side sill 3, such as a bus or a work vehicle. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle lower-body structure, comprising:
   a front pillar including a front-pillar outer panel and a front-pillar inner panel superposed one on the other in a vehicle width direction to define a closed section extending upward or downward; and
   a side sill including a side-sill outer panel and a side-sill inner panel superposed one on the other in the vehicle width direction to define a closed section extending in a front-rear direction, the side sill including a front portion joined to a lower portion of the front pillar,
   wherein the front-pillar outer panel is joined to an outer surface of the side-sill outer panel,
   wherein the front-pillar inner panel is held between the side-sill outer panel and the side-sill inner panel,
   wherein a reinforcement member is disposed to the front portion of the side sill, and
   wherein each of the side-sill outer panel and the side-sill inner panel includes a vertical bead disposed in front of the reinforcement member and below the front pillar, the vertical bead extending vertically.

2. The vehicle lower-body structure according to claim 1, wherein the vertical bead of the side-sill inner panel has a width in the front-rear direction smaller than the width of the vertical bead of the side-sill outer panel.

3. The vehicle lower-body structure according to claim 1, wherein the vertical bead of the side-sill outer panel continuously extends at least from an upper wall to a side wall of the side-sill outer panel and the vertical bead of the side-sill inner panel continuously extends at least from an upper wall to a side wall of the side-sill inner panel.

4. The vehicle lower-body structure according to claim 1, wherein the reinforcement member includes at least one of a stiffener, disposed to the side-sill inner panel, and a reinforcing gusset, disposed at a joint between the front-pillar inner panel and the side-sill inner panel.

5. The vehicle lower-body structure according to claim 4,
   wherein the reinforcement member includes at least the stiffener having an L shape in a sectional view,
   wherein the stiffener is joined to an upper wall and a side wall of the side-sill inner panel from a vehicle exterior side and extends along a ridgeline defined between the upper wall and the side wall, and
   wherein the side-sill inner panel includes a horizontal bead below the stiffener, the horizontal bead extending in the front-rear direction.

6. The vehicle lower-body structure according to claim 4,
   wherein the reinforcement member includes at least the reinforcing gusset,
   wherein the front-pillar inner panel includes a corner flange, disposed along a lower front corner of a door opening, and a swell portion, which protrudes along the corner flange, and
   wherein the reinforcing gusset has a substantially quadrangular pyramid shape so as to cover a vehicle interior side of the swell portion.

7. The vehicle lower body structure according to claim 4,
   wherein the reinforcement member includes at least the reinforcing gusset, and
   wherein the front-pillar inner panel is joined to a jack-up plate below the reinforcing gusset.

8. The vehicle lower-body structure according to claim 1,
   wherein a lower end of the front-pillar outer panel is joined to an upper wall of the side-sill outer panel and an upper portion of a side wall of the side-sill outer panel,
   wherein an opening is formed at a front end of the side sill, and
   wherein the opening is closed by a side outer panel.

9. The vehicle lower-body structure according to claim 1, wherein the front-pillar outer panel is joined to the outer surface in the vehicle width direction of the side-sill outer panel.

10. The vehicle lower-body structure according to claim 2, wherein the vertical bead protrudes in the vehicle width direction.

11. The vehicle lower-body structure according to claim 3, wherein the side-sill outer panel has an angled C-shape cross-section comprising the upper wall, the side wall and a lower wall, and the side-sill inner panel has an angled C-shape cross-section comprising the upper wall, the side wall and a lower wall.

12. The vehicle lower-body structure according to claim 4, wherein the stiffener is disposed to an outer surface of the side-sill inner panel In the vehicle width direction, and the reinforcing gusset is disposed to an inner surface of the front-pillar inner panel and an inner surface of the side-sill inner panel in the vehicle width direction.

13. The vehicle lower-body structure according to claim 5, wherein the ridgeline extends in the front-rear direction.

14. The vehicle lower-body structure according to claim 6, wherein swell portion protrudes toward the vehicle interior.

15. The vehicle lower-body structure according to claim 8, wherein the side-sill outer panel has an angled C-shape cross-section comprising the upper wall, the side wall and a lower wall.

16. A vehicle comprising the vehicle lower-body structure according to claim 1.

* * * * *